2 Sheets—Sheet 1.

B. F. WALTERS.

Mode of and Apparatus for Cleaning and Polishing Peanuts.

No. 9,360. Reissued Aug. 31, 1880.

*Witnesses:*

N. A. Low

H. H. Bliss

*Inventor:*

Benjamin F. Walters by W. A. Bonbledey atty

N. PETERS, PHOTO-LITHOGRAPHER, WASHINGTON, D. C.

2 Sheets—Sheet 2.

B. F. WALTERS.

Mode of and Apparatus for Cleaning and Polishing Peanuts.

No. 9,360. Reissued Aug. 31, 1880.

*Witnesses:*

N. S. Low

H. H. Bliss

*Inventor:*

Benjamin F. Walters by W. A. Doubleday atty

N. PETERS, PHOTO-LITHOGRAPHER, WASHINGTON, D. C.

UNITED STATES PATENT OFFICE.

BENJAMIN F. WALTERS, OF NORFOLK, VIRGINIA.

MODE OF AND APPARATUS FOR CLEANING AND POLISHING PEANUTS.

SPECIFICATION forming part of Reissued Letters Patent No. 9,360, dated August 31, 1880.

Original No. 220,450, dated October 7, 1879. Application for reissue filed January 17, 1880.

*To all whom it may concern:*

Be it known that I, BENJAMIN F. WALTERS, of Norfolk, in the county of Norfolk and State of Virginia, have invented certain new and useful Improvements in Peanut Cleaning and Polishing Apparatus; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
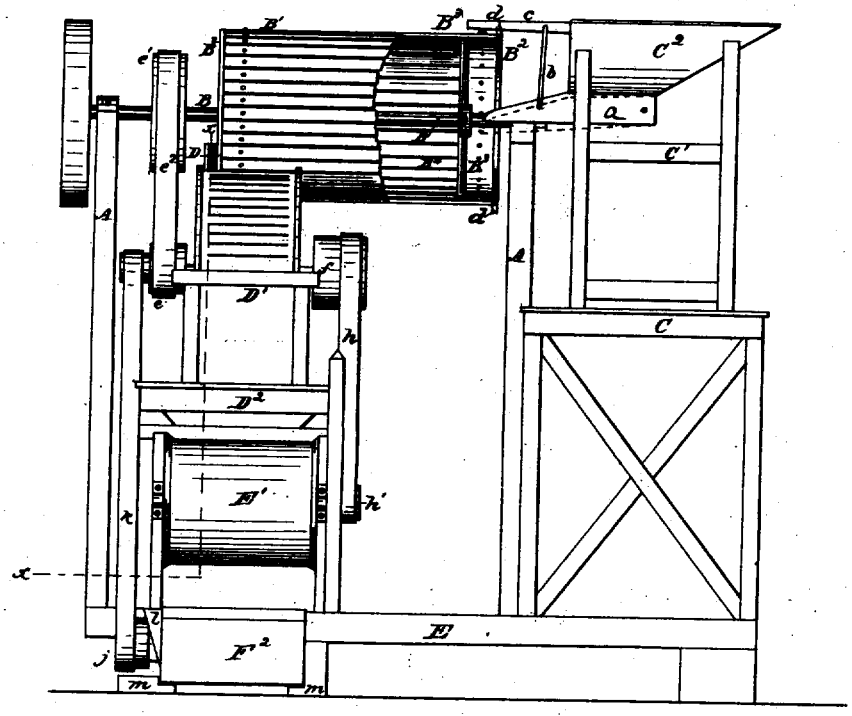
Figure 3:
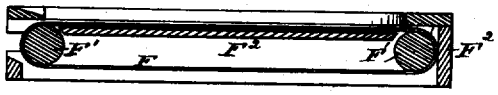
Figure 2:
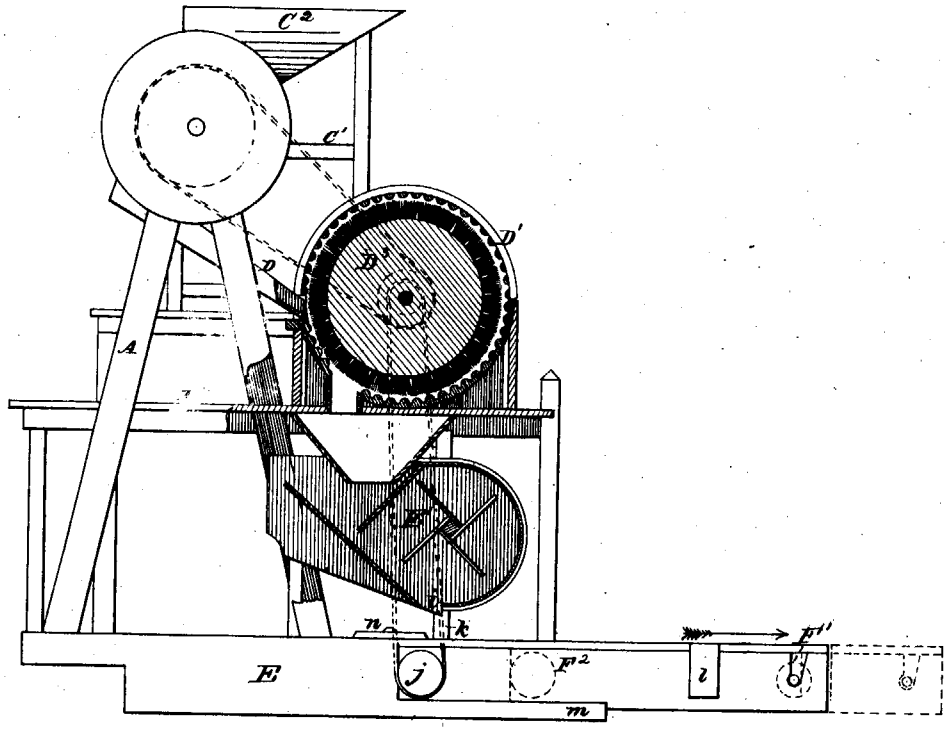

Figure 1 is a side elevation, with a portion of the cleaning-cylinder broken away. Fig. 2 is a sectional end view, the section being taken through line *x x* of Fig. 1. Fig. 3 is a detail sectional view of the detachable picking-belt.

In the drawings, A represents an elevated frame-work, in bearings in the upper end of which is journaled a shaft, B, carrying the cleaning-cylinder B′, whose periphery is made of longitudinal bars, spaced so as to leave openings, through which the impurities drop as they become detached. This cylinder is provided with annular heads $B^2$ $B^3$, which are attached to the shaft by radial arms. At one end of this cylinder are erected an elevated platform, C, and frame-work C′, which support a hopper, $C^2$, into which the peanuts are dumped to be fed to the cylinder. This feeding is effected by the agitation of the loosely-connected spout *a*, which is connected by a rod, *b*, to the shaker-bar *c*. This bar is joined to the hopper, and its other end rests upon the periphery of the cylinder, which latter is provided with a series of tappets, *d*, which, in the rotation of the cylinder, alternately lift the shaker-bar and allow it to fall, so as to give the necessary agitation to the spout to secure the uniform feeding of the nuts.

Just below the discharging end of the cylinder is arranged a chute, D, which carries the partially-cleaned nuts to a polishing device. This polishing device is sustained upon a platform, $D^2$, and consists of a circular case, D′, having a detachable semicircular slotted cover, and containing a brush, $D^3$, fixed to a shaft carrying pulleys *e* and *f*. Of these pulleys, *e* is connected with a pulley, *e′*, on the cylinder-shaft by a belt, $e^2$, so that the brush derives rotary motion from said cylinder-shaft. Just below the polisher, upon a lower platform, E, is the separator E′, which receives the polished nuts from the discharge-opening of the polisher. This separator is in the nature of a fan, and serves to blow out and separate the fine particles and dust which have been removed by the polisher, and also the light faulty nuts. This fan is rotated by a belt, *h*, connecting the pulley *f* of the polisher with the pulley *h′* on the fan-shaft. As the nuts are discharged from the separator they pass through an opening, *i*, in the lower platform, and are delivered upon an endless apron, F, passing around two rollers, F′ F′, and to one of which rollers motion is communicated through a pulley, *j*, and a belt, *k*, connecting said pulley with a face on the pulley *e* of the polishing device. The rollers carrying this endless apron F are journaled within a hollow case, $F^2$, so that the apron forms the top of the same, and said case and apron are extended horizontally from the rest of the apparatus, so that the apron forms a receiver for the peanuts from the separator, and carries said nuts to a position where hands pick out the dark and broken nuts from the apron as it moves along.

For the convenient separation of these faulty nuts pockets *l* are arranged beside the picking-apron, which lead to separate receptacles, into which pockets the pickers drop the faulty nuts, while the good ones are allowed to pass over the end of the apron and be discharged into a suitable receptacle.

With respect to the brushes, I would state that two brushes have been used in connection with each other for the same purpose, as shown in my prior Patent, No. 128,515; but my present construction of a single brush with an inclosing-case having a ribbed interior surface secures a better rotation of the nuts and causes the latter to revolve, so that the brush can act on all sides of the same, and also, by direct impact against the rigid ribs, are freed of the closely-adhering lumps or cakes of earth, which the brush alone cannot dislodge.

I am aware, also, that a single brush revolving on a vertical axis has been used in an interiorly-ribbed case for cleaning rice; but when comparatively large and heavy bodies, like peanuts, are to be cleaned this vertical arrangement would not do, for the reason that they would fall directly to the bottom down the vertical grooves. I therefore not only arrange my brush upon a horizontal axis, but locate the feed-chute near a horizontal line passing through the center of the brush, so that the peanuts are caught by the brush, carried up to the highest point of the brush, thence all around the circumference of the case at right angles to the ribs, and are finally discharged near the point of entrance, which action secures a very thorough cleaning and polishing of the nuts.

The endless apron F is made quite long, to allow a sufficient number of pickers to get around the same, and therefore occupies much floor-space; and to economize this when the machine is not at work, I make the case $F^2$, rollers F′ F′, and apron F together detachable from the base E, so that it may be set out of the way. For holding it in place it is run in ways *m m*, and to resist the upward-pulling tendency of the belt *k* this end of the case is slipped beneath an overhanging ledge, lip, or cleat, *n*. While this cleat, then, resists the lifting action of the belt, the guideways *m m* preserve the proper plane of rotation of the picking-apron pulley *j* to the drive-belt and pulley on the brush-shaft, so that the readjustment of the detachable apron is always true and the drive-belt does not run off.

What I claim is—

1. The brush $D^3$, arranged to revolve on a horizontal axis, in combination with a circular inclosing-case, D′, slotted in its upper half and having a ribbed internal surface, an inlet in the plane of the brush near the horizontal line, and an outlet near the point of entrance, whereby the peanuts are carried first up and then around the greater part of the circumference of the case before being discharged, substantially as set forth.

2. The detachable picking-apron having pulley *j*, in combination with the separator, the drive-belt, and the platform or base-frame E, having guides *m m* and cleat *n*, substantially as and for the purpose described.

3. As an improved apparatus for cleaning and polishing nuts, the combination, substantially as herein set forth, of the following elements, viz: the rotating cylinder, whereby the nuts are separated from dirt by mutual attrition; the combined rolling and brushing device, consisting of a rotatory brush and a stationary case having projections on its interior surface to roll the nuts; and the fanning device, arranged to receive material from the brush and to produce a separation between the perfect and imperfect nuts.

4. The method of separating nuts containing full kernels from dirt and from those having faulty kernels, which consists in rumbling them, whereby they are subjected to mutual attrition and the coarsest dirt is removed, brushing them while being grasped and rolled, whereby all parts of each nut are brushed in succession and the recesses and pores are cleaned, and fanning and winnowing them, whereby the last particles of dirt, together with the faulty nuts, are removed, substantially as described.

5. In a machine for cleaning nuts, a brush arranged to revolve on a horizontal axis, in combination with an inclosing-case, which is constructed to provide a continuous concave polishing-surface around the brush, and which is provided with an inlet in the plane of the brush and an outlet near the point of entrance, whereby the nuts are carried around the greater part of the circumference and over the top of the brush before being discharged, substantially as set forth.

In testimony that I claim the foregoing I have hereunto set my hand this 30th day of December, 1879.

BENJAMIN F. WALTERS.

Witnesses:

H. H. BLISS,

C. G. METTS.